F. VAN ESBROECK.
APPARATUS FOR DETECTING SUBAQUEOUS SOUNDS.
APPLICATION FILED JULY 31, 1916.
1,239,320.
Patented Sept. 4, 1917.
3 SHEETS—SHEET 1.
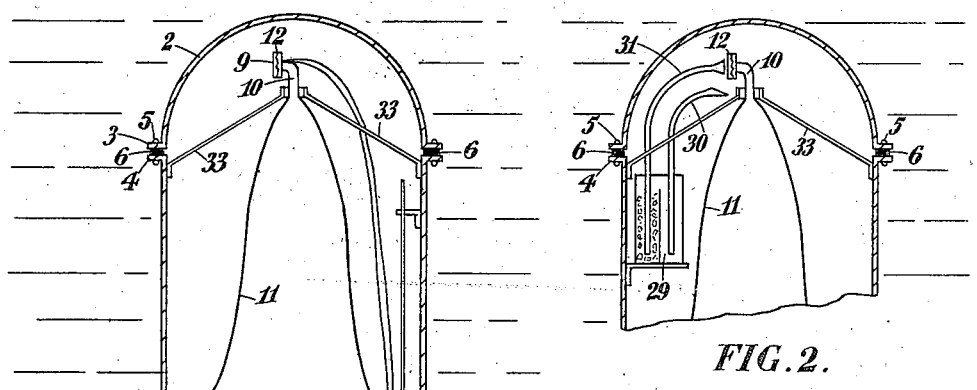
FIG. 2.
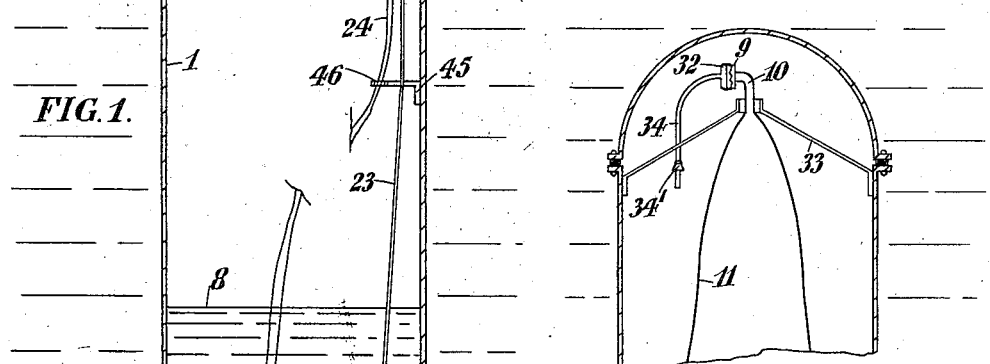
FIG. 3.
FIG. 1.
FIG. 4.
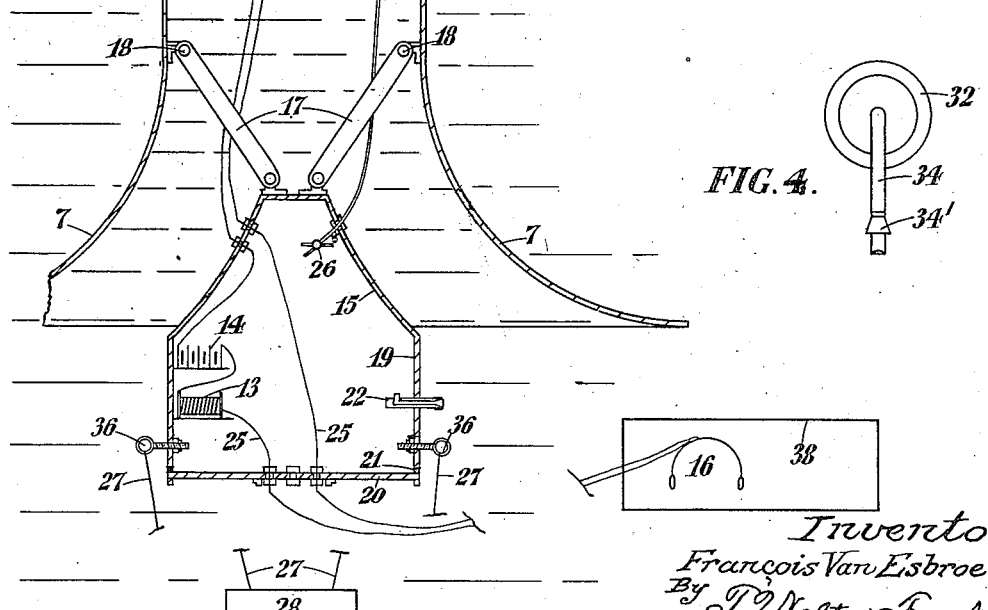
Inventor.
François Van Esbroeck
By T. Walter Fowler
atty.

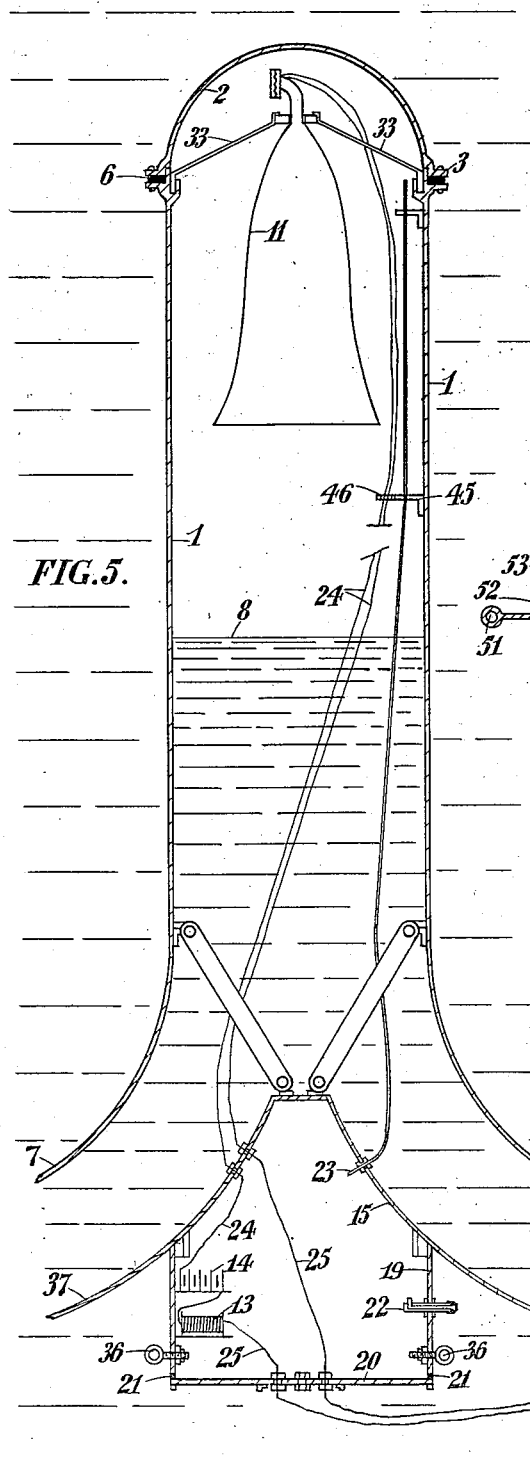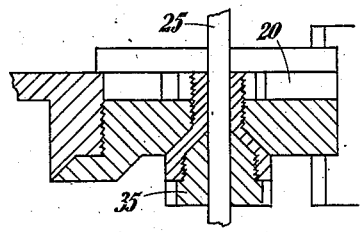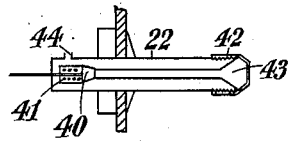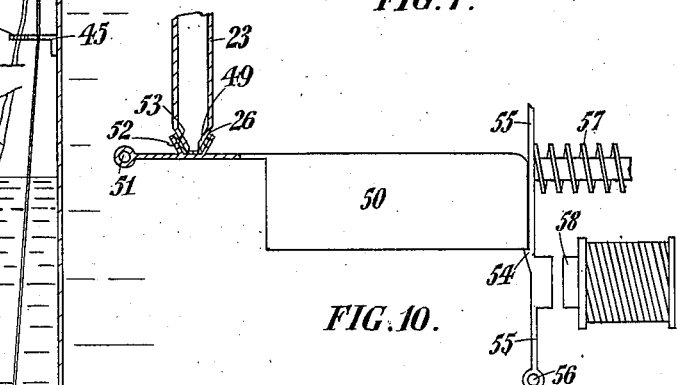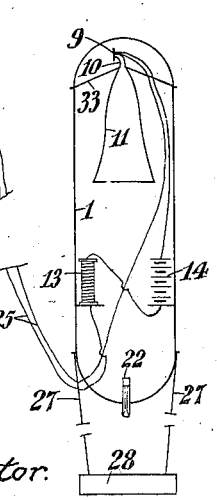

UNITED STATES PATENT OFFICE.

FRANÇOIS VAN ESBROECK, OF LONDON, ENGLAND, ASSIGNOR TO EDITH MAY CRANSTON, OF SOUTHSEA, ENGLAND, AND ALLEN PAULL, OF KINGSWOOD, ENGLAND.

APPARATUS FOR DETECTING SUBAQUEOUS SOUNDS.

1,239,320.   Specification of Letters Patent.   Patented Sept. 4, 1917.

Application filed July 31, 1916. Serial No. 112,366.

*To all whom it may concern:*

Be it known that I, FRANÇOIS VAN ESBROECK, a subject of the King of Belgium, and at present residing at 118 Elgin Crescent, Notting Hill, London, England, late assistant harbor-master to the port of Antwerp, Belgium, have invented a certain new and useful Apparatus for Detecting Subaqueous Sounds, of which the following is a full, clear, and exact description.

This invention relates to improvements in apparatus for detecting or picking up subaqueous signals or sounds, such for example as discovering the vicinity of a submarine or submersible vessel by the vibrations from its screw propellers.

The present invention is of the type in which a microphone is arranged in an air-containing vessel adapted to be submerged, said microphone being electrically connected with an earpiece or telephone receiver at a distance from the aforesaid vessel so that sounds collected by the microphone are transmitted to the distant receiver.

According to the present invention I fit in the air space of an elongate container (diving-bell vessel or buoy) a horn or concentrator which not only leads to the microphone but is open mouthed so that vibrations from the water to the air in the vessel can freely enter the horn or concentrator and are not impeded or obstructed by an intermediate diaphragm or casing between said air space and the microphone upon which they are concentrated by the horn.

The elongate vessel or container which I employ is of mainly cylindrical shape so that the mouth or flared end of this concentrating device faces, and is exposed to, the axial or longitudinal waves of sound within the vessel or container.

I also provide means for admitting compressed air to the vessel for the purpose of increasing the power of the microphone, and also, where the elongate vessel is of the diving bell type, for the purpose of bringing said vessel to the surface by means of a supplementary admission of air. The invention also relates to the construction of the elongate vessel containing the microphone and concentrating horn, to the provision of a moisture-absorbing device adjacent to the microphone, and to other features which will be hereinafter set forth.

Upon the accompanying drawings which illustrate the present invention:—

Figure 1 is a sectional elevation, showing the diving bell, a closed casing or chamber containing compressed air and a sinker or anchoring device.

Fig. 2 is a sectional elevation of the upper part of a diving bell with a moisture-absorbing device.

Fig. 3 is a similar view showing a protective sheathing for the microphone.

Fig. 4 is a front elevation of the said protective sheathing.

Fig. 5 is a sectional elevation of the separate closed chamber provided with a top extending beyond the body of the chamber and curved to follow the trumpet mouth of the diving bell vessel.

Fig. 6 is a section on a larger scale of a suitable water tight joint through the casing of the closed chamber.

Fig. 7 is a sectional elevation of an air valve.

Fig. 8 is a sectional elevation of a modification of the diving bell vessel.

Fig. 10 shows a suitable valve capable of being opened from a distance.

Figure 9:
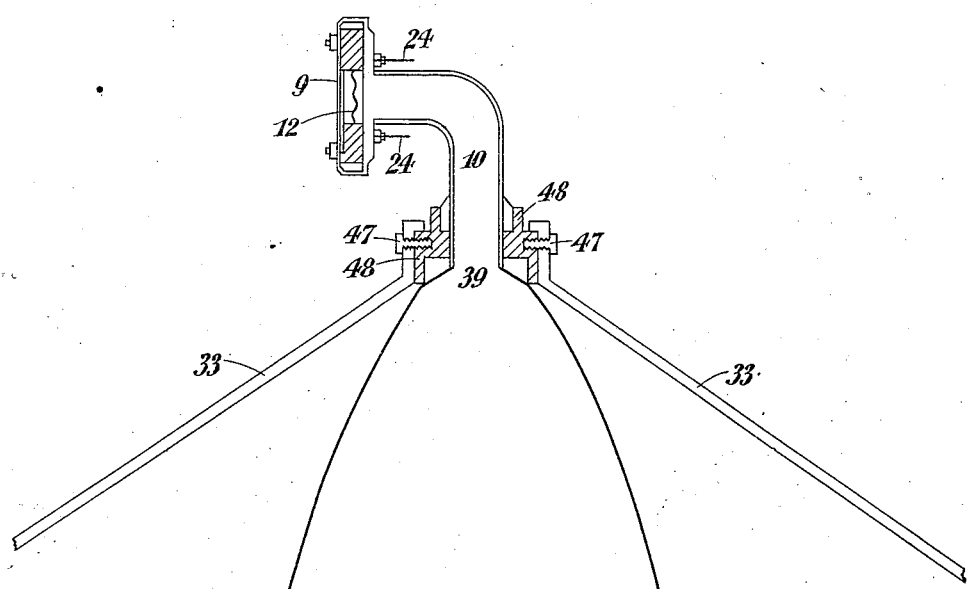
Fig. 9 is a view on a larger scale of the parabolic horn, elbow pipe and microphone.

At 1, I have shown a suitable vessel of the diving bell type. This may be made for example of a cylindrical tube with a wall of about 3 mm. thickness, the length of the cylinder being for instance four times its diameter. This cylinder at its upper end is fitted with a hemispherical or domed cap 2 secured thereto by means of the flanges 3, 4 and bolts 5 with the interposition of a rubber gasket 6 between said flanges to afford an air tight joint so that the vessel is mainly or principally of cylindrical shape. At its lower end the cylinder 1 is formed with or provided with a bell or trumpet mouth 7 the radius of the curve of the latter being preferably equal to the diameter of the cylinder 1. This trumpet mouth portion 7 may be of the same material as the cylinder 1 and of the same thickness.

As for example, the cylinder 1 may be 1 meter in length in which case a thickness of 2 mm. is sufficient for the wall of the cylinder and trumpet mouth. This diving bell vessel is suspended at any convenient depth below the surface of the water, say at 20 meters below the surface. The level of water in the diving bell is indicated in Fig. 1 for this depth at 8.

The water has free access through the trumpet mouth 7 to the lower part of the diving bell cylinder 1 so that vibrations in the surrounding water are not impeded in their passage to the water inside the submerged diving bell and thence to the air inclosed in said bell 1.

A microphone 9 is mounted in the upper part of this diving bell so that said microphone is in air at a pressure above atmospheric, the extent of the increased pressure depending naturally upon the depth to which the diving bell vessel is submerged; in the drawings the microphone is shown secured by means of an elbow pipe 10 to a parabolic horn device 11 also arranged within the diving bell vessel. The elbow pipe 10 is shown supported by means of stays 33 from the interior of the cylinder and the microphone is located within the air space at top of the vessel 1 and has its diaphragm 12 normally vertical. This microphone may be of any suitable type comprising a frame and a diaphragm but preferably it is of the well known D. Hunning type employing hollow granulations, and it is connected by suitable electrical cables 24, 24, to a Ruhmkorff coil 13 and a battery 14, thence by similar cables 25, 25 to a telephone receiver 16 or the like on a ship, land station or other suitable listening post diagrammatically indicated at 38. In Fig. 1 this coil and battery are provided in a separate closed chamber, 15, below the cylindrical bell, 1.

This closed chamber 15 may consist of a cylindrical box made of the same sheet metal as the cylinder 1 and be secured to the latter by means of tie rods or links 17 which are pivotally connected at 18 to the interior of the trumpet mouth portion. The upper part of this closed chamber 15 is coned or, if desired and as shown in Fig. 1, curved parallel to the line of the trumpet mouth aforesaid, while the lower part is cylindrical as at 19 and approximately of the same diameter as the cylinder of the diving bell. Its height may be approximately one sixth of that of the cylinder 1. At the base of the closed chamber 15 is a lid or cover 20, with a gasket 21 to insure a tight joint.

This closed chamber 15 is also provided with a valve 22 whereby air under pressure may be passed thereinto and stored therein. This valve (see Fig. 7) is provided with a plug 40 normally held in its seating by a spring 41. A removable screw cap is shown at 42, while 43 is the inlet and 44 the outlet.

A pipe 23 provided with a controllable valve 26 leads to the air space of the diving bell 1 so that when required additional air at increased pressure may be passed from the closed chamber 15 to the diving bell 1. I find it advantageous to supply air at twelve atmospheres pressure to this chamber 15.

The arrangement of the apparatus is such that the diving bell 1 is partly filled with water, adjusted to be submerged with the closed chamber 15 which it supports, to the desired depth below the surface of the water, and is connected by means of cables 27, 27 to a suitable sinker 28. The bell 1 will remain suspended in the water at this height because of the air inside the diving vessel, but when it is desired that the diving vessel should rise to or toward the surface, additional compressed air is passed through the valve-fitted pipe 23 from the closed chamber 15 to the upper part of the diving bell, whereupon the latter rises.

The pipe 23 is guided by a bracket 45 on the interior wall of the bell 1 and this bracket 45 has a loop 46 through which the electrical cables for the microphone are passed. These cables 24 may be passed up the bell 1 to the microphone in any convenient manner and they may be tied to the interior of the bell at several points as 46.

A moisture-absorbing device such as a container 29 of quicklime or other suitable material may be provided in the upper part of the diving bell, see Fig. 2; this container is fitted with a device comprising a downwardly-leading tube 30 for the moist air and an upwardly leading tube 31 from the container, whereby moisture is absorbed from the air near 9 and drier air is provided in the immediate neighborhood of the microphone.

In Figs. 3 and 4, the microphone 9 is shown provided with a device whereby it is shielded or protected from vibrations other than those reaching it through the parabolic horn 11 and elbow pipe 10. Upon the back of the microphone 9 and around its frame I arrange a rubber or similar sheathing 32 connected to a rubber pipe 34 dependent from the microphone on the side remote from the elbow 10. This pipe 34 is provided at its free extremity with a non-return valve 34 or flap to allow the air under increased pressure in the diving bell 1 to enter said pipe 34.

Provision is made for water tight joints through the walls and lid of the closed chamber 15 for the electric cables 24, 25 leading to the microphone 9 and to the earpiece or receiver 16. In Fig. 6 which is a diagram on a large scale, 35 represents a nut between which and its socket 35', packing of any suitable kind may be inserted, around cable 25 where it passes through the base 20.

Lugs 36 for the connections 37 to the weights or sinkers 28 are shown in Fig. 1 and the air valve 22 is shown on a larger scale in Fig. 7.

The horn or megaphone 11 within the diving bell is preferably of parabolic section and preferably made of copper of a thickness of about 1 mm. This horn has its axis coincident with or parallel with that of the cylinder 1 and may be sustained in position by the struts 33 or other suitable devices. The purpose of this horn 11 is to concentrate the vibrations into the center of the bent pipe leading to the microphone. This arrangement in conjunction with the mainly cylindrical shape of the container 1 and the mounting of the microphone in compressed-air inside the container augments the power of the microphone and intensifies the sounds transmitted through the receiver 16.

In Fig. 5 I have shown a modification in which the separate closed chamber 15 is provided with a top 37 which is extended outwardly beyond the body portion 19 of the chamber 15, the said top being shaped to follow in a parallel manner the trumpet-mouth lower end of the diving bell vessel 1. The top 37 is continued until its extremity or periphery is vertically below the outer periphery of the lower end 7 of the bell vessel 1. This arrangement is advantageous inasmuch as the extended top 37 reflects into the upper cylinder 1 the waves of sound collected between 37 and the trumpet mouth 7. In Fig. 5 the level of water 8 is shown as if the apparatus were submerged 30 meters below the surface.

In Fig. 8 I have shown another modification in which the separate chamber 15 is dispensed with. In this arrangement the diving bell vessel 1 is closed at both ends. This closed vessel 1 contains the microphone 9, the elbow pipe 10, and horn 11 and air under pressure and is preferably of cylindrical shape with domed top and bottom (as shown) so that there are no flat exterior surfaces. The coil and battery are arranged within the vessel 1 and the air valve 22 is provided to allow compressed air to be pumped therein when necessary and before the vessel is submerged. This modification is more particularly adapted for use in detecting short distance signals e. g. from distances about 1 mile to 2 miles while the arrangements shown in Figs. 1 and 5 serve to detect signals or vibrations at a distance of up to 8 miles or even from greater distances. These distances will depend upon the intensity of the sound and the efficiency of the parabolic horn and microphone.

In Fig. 9 I have shown the proper shape for the parabolic horn 11. This has an area at its bell mouth of about one hundred times the area of the orifice at its apex or of its focus 39. The stays 33 in this view are clearly shown secured by screws 47 to a collar 48 which surrounds the elbow pipe 10.

In Fig. 10 I have shown a form of valve 26 adapted to be opened from a distance. The tube 23 has a coned end 49. A weight 50 pivoted at 51 is provided with a cap 52 for the coned end 49 and is lined with rubber or the like 53. This weight 50 can be supported in the valve-closing position by a spur 54 on a lever 55 pivoted at 56. Lever 55 is pressed toward 50 by the spring 57. In the other direction it can be attracted by means of the electromagnet 58 so that when current is passed through 58 the spur 54 is withdrawn and the weight 50 falls, thereby opening the valve and allowing extra air to pass up tube 23 from 15 to 1.

It will be observed that the sound vibrations from the water are transmitted to the compressed air inclosed within the vessel 1 and thence are led by the horn 11 direct to the microphone 9 which acts as a transmitter; there is nothing to baffle or impede the said sound vibrations on their way to the microphone and these sound vibrations are in fact concentrated and intensified on their passage from the water to the transmitting microphone. The increased pressure of air in the container 2 acting upon the microphone in the container 2 has for effect to augment the power of the microphone.

The diving-bell vessel or buoy it will be noted is mainly or principally cylindrical, so that the vibrations caught at the open end of the concentrating horn travel axially or longitudinally of the vessel toward the microphone. Further this cylindrical shape of the main portion of the diving-bell vessel (Figs. 1 and 5) or air-containing vessel (Fig. 8) is advantageous in that the device is not likely to collect upon its exterior traveling matter and is not so likely to be affected interiorly by contact with passing seaweed or other floating bodies. As will be understood it is important that so far as possible only vibrations of the kind which it is wished to detect should be communicated to the compressed air inside the container 1 and thence through the sound concentrating device 11 to the microphone 9.

Having thus described my invention what I claim as such and desire to secure by Letters Patent is:—

1. An apparatus for detecting subaqueous sounds, comprising a submersible and air-containing vessel of elongate shape so that the air space is of greater height than width, a microphone mounted in the upper portion of the air space of said vessel and a sound-concentrating device leading to said microphone, the mouth of the said sound-concentrating device directly facing, and being exposed to, the waves of sound within the elongate vessel, a receiver, and electrical connections between said receiver and microphone.

2. An apparatus for detecting subaqueous sounds, comprising an air-containing vessel of elongate shape, said vessel adapted to be submerged below the surface of the water in an upright position, a microphone mounted in the upper portion of the air space of said vessel, a receiver at a post remote from the elongate vessel, said receiver being in electrical connection with the microphone, and a sound-concentrating device having a mouth directly exposed to the longitudinal waves of sound within the elongate vessel.

3. In an apparatus for detecting subaqueous sounds, an elongate air-containing and submersible vessel having an air-space of principally cylindrical shape, a transmitter-microphone within the upper portion of the air space of said vessel, a sound-concentrating horn arranged within the said elongate vessel and leading to said microphone, the mouth of said horn being exposed to the longitudinal sound waves within said elongate vessel, a receiver at a listening station, and electrical connections between said microphone and said receiver.

4. In an apparatus for detecting subaqueous sounds, an air-containing vessel of the diving bell type and of elongate shape, a trumpet mouthed bottom to said elongate vessel to allow the entry of water below the air compressed in said vessel, and said vessel including a cylindrical portion, a microphone mounted in the upper part of the air space of said vessel, a sound-concentrating device leading to said microphone, said concentrating device including a horn having its axis arranged approximately co-axial with the axis of said cylindrical portion of the air-containing vessel, and a receiver at a listening post remote from the elongate vessel, said receiver being in electrical connection with the microphone.

5. In an apparatus for detecting subaqueous sounds, an air-containing vessel having an open trumpet-mouthed bottom, a cylindrical middle portion and a domed cap, a microphone mounted within the air space of said vessel, a sound-concentrating device arranged with said air space and leading to said microphone, said concentrating device including a horn having its mouth facing the water at the bottom of the vessel, a receiver upon a listening post remote from the vessel, and electrical connections between said receiver and said microphone.

6. In an apparatus for detecting subaqueous sounds, an air-containing vessel which is mainly cylindrical in shape, said vessel having a trumpet-mouthed bottom open to the water and said vessel being adapted to be submerged, a microphone in the upper part of the air space of said vessel, a sound-concentrating device having its wider end facing the water at bottom of the vessel and its smaller end leading to the microphone, a receiver, electrical connections between said receiver and said microphone, a closed compartment suspended from the vessel and containing compressed air, and means for passing air from said closed compartment to the upper vessel.

7. In an apparatus for detecting subaqueous sounds, a submersible air-containing vessel of elongate shape, said vessel having a trumpet-mouthed bottom open to the water, a microphone secured in the upper part of the air space of said vessel, a sound-concentrating device having its wider end facing the water at bottom of the vessel and its smaller end leading to the microphone, a receiver upon a listening post remote from the said vessel, electrical connections between said receiver and said microphone, a closed compartment suspended from the vessel and containing compressed air, said closed compartment having a cover with lateral extensions which are parallel with and are continued to below the periphery of the trumpet-mouthed bottom of the upper vessel, and means for passing air from said closed compartment to the upper vessel.

8. An apparatus for detecting subaqueous sounds, comprising a submersible diving-bell vessel, a microphone arranged within the upper part of the air space of said vessel, means for supporting the microphone from the interior of said vessel, means for energizing said microphone, an elbow pipe leading to said microphone, a horn leading to said elbow pipe, means for absorbing moisture within the diving-bell vessel, said means being arranged adjacent to said microphone, and a receiver arranged upon a listening post remote from the vessel, said receiver having appropriate connections with the interior of the vessel whereby sounds and signals picked up by the microphone may be revealed at the receiver.

9. An apparatus for detecting subaqueous sounds, comprising a diving-bell vessel submersible in water, a microphone arranged within the upper part of the air space of said vessel, an elbow pipe leading to said microphone and a trumpet horn leading to said elbow pipe, said microphone, elbow pipe and horn being supported in position from within the vessel, a trumpet mouth at the lower end of said diving-bell vessel through which the water has free access, said water being prevented from rising fully up the vessel by the air compressed within the vessel, a closed chamber connected to and dependent from the diving-bell vessel, said closed chamber containing means for energizing the microphone in the diving-bell vessel and having connections to said microphone, and a receiver remote from the diving-bell vessel and connected with the microphone of the apparatus in such a way that sounds picked up by the microphone are revealed by the said receiver.

10. An apparatus for detecting subaqueous sounds, comprising a diving-bell vessel adapted to be submerged in water, a microphone arranged within the upper part of the air space of said vessel, an elbow pipe leading to said microphone and a trumpet horn leading to said elbow pipe, said microphone, elbow pipe and horn being supported in position from within the vessel, a trumpet mouth at the lower end of said diving-bell vessel through which the water has free access, said water being prevented from rising fully up the vessel by the air compressed within the vessel, a closed chamber connected to and dependent from the diving-bell vessel, said closed chamber containing means for energizing the microphone in the diving-bell vessel and having connections to said microphone, means for admitting compressed air into said closed chamber so that it may be stored therein, a pipe from said closed chamber to the air space of said diving-bell vessel, means for allowing air to pass from the dependent closed chamber through the said pipe to the air space in the diving-bell vessel so that additional compressed air may be passed to the interior of the diving-bell vessel, and a receiver remote from the diving-bell vessel and connected with the microphone of the apparatus in such a way that sounds picked up by the microphone are revealed by the said receiver.

11. An apparatus for detecting subaqueous sounds, comprising a diving-bell vessel adapted to be submerged in water, a microphone arranged within the upper part of the air space of said vessel, an elbow pipe leading to said microphone and a trumpet horn leading to said elbow pipe, said microphone, elbow pipe and horn being supported in position from within the vessel, a trumpet mouth at the lower end of said diving-bell vessel through which the water has free access, said water being prevented from rising fully up the vessel by the air compressed within the vessel, a closed chamber connected to and dependent from the diving-bell vessel, said closed chamber containing means for energizing the microphone in the diving-bell vessel and having connections to said microphone, a top to said chamber extending outwardly parallel with the trumpet mouth base of the diving-bell, and a receiver remote from the diving-bell vessel and connected with the microphone of the apparatus in such a way that sounds picked up by the microphone are revealed by the said receiver.

12. An apparatus for detecting subaqueous sounds, comprising a submersible diving-bell vessel, a microphone mounted within the compressed air in the upper part of the said vessel, an elbow pipe leading to said microphone and a trumpet horn leading to said elbow pipe, said horn being substantially above the level of the water inside the diving-bell vessel, a trumpet mouth at the lower end of said diving-bell vessel, a closed chamber connected to and dependent from said diving-bell vessel, said closed chamber supporting an external anchoring device and containing means for electrically energizing said microphone through appropriate connections, a receiver remote from said diving-bell vessel and connections between said receiver and said microphone whereby sounds and signals picked up by said microphone are revealed by said receiver.

13. An apparatus for detecting subaqueous sounds, comprising a diving-bell vessel adapted to be submerged in water, a microphone mounted in the air space within said vessel so that it is in the compressed air above the water in the vessel, an elbow pipe leading to said microphone, a trumpet horn leading to said elbow pipe so as to concentrate vibrations on to the microphone, a trumpet mouthed base to said diving-bell vessel, a closed chamber dependent from said vessel and having its upper portion shaped correspondingly with the trumpet mouth base of said diving bell vessel, a Ruhmkorff coil, and an electrical battery in said closed chamber, electrical connections from said coil and battery to said microphone, and a telephone receiver electrically connected with said apparatus whereby sounds and signals picked up by the microphone are heard in the said telephone receiver.

14. An apparatus for detecting subaqueous sounds, comprising a submersible diving bell vessel, a microphone having a frame and a diaphragm mounted in the compressed air of said vessel, an elbow pipe leading to said microphone, a horn leading to said pipe, an insulating sheathing adapted to be fitted to the frame of said microphone, said sheathing having a dependent tube on the side of the microphone remote from said elbow pipe and a non-return valve upon the lower end of said pipe, means for energizing the said microphone and a receiver removed from the apparatus with connections thereto whereby sounds picked up by the microphone are revealed in the receiver.

15. In an apparatus for detecting subaqueous sounds, a diving bell vessel which comprises a cylindrical portion, a domed top to said cylindrical portion, a trumpet-shaped lower part to said cylindrical portion with means for supporting a microphone in the compressed air within said vessel and means for supporting from the lower end of said vessel a closed chamber having a top curved to correspond with the trumpet mouth of said diving bell vessel.

16. In an apparatus for detecting subaqueous sounds, the combination of a submersible diving-bell vessel having a microphone arranged in the upper part of the air space of said vessel; a closed chamber supported from the lower part of said diving-bell vessel; a telephone receiver outside the apparatus; and electrical connections to said microphone and telephone receiver whereby sounds detected by said microphone are transmitted to said telephone receiver.

17. An apparatus comprising a submersible diving-bell vessel containing a microphone, a closed chamber dependent from the diving-bell vessel and containing means for energizing said microphone, and connections with an external telephone receiver, whereby sounds detected by the microphone are transmitted to the said receiver.

18. An apparatus comprising a submersible diving-bell vessel, a microphone mounted in the compressed air of said vessel, a trumpet-shaped base to said diving bell vessel, a closed chamber connected by links to the lower part of said vessel, said closed chamber containing means for energizing said microphone, a telephone receiver, and electrical connections from said microphone and receiver to said closed chamber whereby sounds detected by said microphone may be heard on said telephone receiver.

19. An apparatus adapted to be submerged in water for the purpose of detecting sounds, signals and vibrations in said water, comprising a diving-bell vessel, means for retaining air within said vessel, a trumpet shaped lower end to said vessel through which the water has access thereby increasing the pressure of the air within said vessel, a microphone mounted in the air space of said vessel so as to be exposed to the air at increased pressure within said air space, said microphone being arranged with its diaphragm normally vertical, an elbow pipe leading to said microphone, a parabolic horn leading to said elbow pipe, and means for receiving the sounds detected by said microphone.

20. An apparatus for detecting subaqueous sounds, comprising a submersible diving-bell vessel having an air space in its upper part, a microphone arranged in said air space, an elbow pipe leading to said microphone, a parabolic horn leading to said elbow pipe, means for supporting said microphone, elbow pipe and horn from the interior of the vessel, a closed chamber below said vessel and supported therefrom by pivoted links, a receiver electrically connected with said microphone, and a sinker secured to said closed chamber.

21. An apparatus for detecting subaqueous sounds, comprising a submersible diving-bell vessel having an air space in its upper part, a microphone arranged in said air space, an elbow pipe leading to said microphone, a parabolic horn leading to said elbow pipe, means for supporting said microphone, elbow pipe and horn from the interior of the vessel, a closed chamber below said vessel and supported therefrom by pivoted links, a receiver electrically connected with said microphone, dependent connections from said closed chamber and a sinker secured to said connections, said sinker being thereby detachably connected with said closed chamber.

In testimony whereof I have affixed my signature in presence of two witnesses.

FRANCOIS VAN ESBROECK.

Witnesses:
VICTOR FALLON FEENY,
H. D. JAMESON.